United States Patent
Huwer

(10) Patent No.: US 12,111,972 B2
(45) Date of Patent: Oct. 8, 2024

(54) AUTOMOTIVE OPERATING SYSTEM

(71) Applicant: Volkswagen Aktiengesellschaft, Wolfsburg (DE)

(72) Inventor: Wojciech Huwer, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/413,505

(22) PCT Filed: Nov. 29, 2019

(86) PCT No.: PCT/EP2019/083028
§ 371 (c)(1),
(2) Date: Jun. 11, 2021

(87) PCT Pub. No.: WO2020/120164
PCT Pub. Date: Jun. 18, 2020

(65) Prior Publication Data
US 2022/0050530 A1     Feb. 17, 2022

(30) Foreign Application Priority Data
Dec. 13, 2018 (DE) .......................... 102018221706.8

(51) Int. Cl.
G06F 3/01        (2006.01)
G06F 3/0354    (2013.01)
(Continued)

(52) U.S. Cl.
CPC .......... *G06F 3/017* (2013.01); *G06F 3/03547* (2013.01); *G06F 3/0393* (2019.05);
(Continued)

(58) Field of Classification Search
CPC .... G06F 3/017; G06F 3/03547; G06F 3/0393; G06F 3/0488; B60K 2370/1434
See application file for complete search history.

(56) References Cited

U.S. PATENT DOCUMENTS 7,084,859 B1 *   8/2006   Pryor ................... G06F 3/0488
                                                                    345/173
7,564,448 B2     7/2009   Yi
(Continued)

FOREIGN PATENT DOCUMENTS

CN          105247251 A        1/2016
CN          106125985 A       11/2016
(Continued)

OTHER PUBLICATIONS

PCT/EP2019/083028. International Search Report. (Feb. 5, 2020).
Corresponding Chinese Application No. 201980080997.7. Office Action (Jul. 12, 2024).

*Primary Examiner* — Benyam Ketema
(74) *Attorney, Agent, or Firm* — Peter Zura; LOZA & LOZA, LLP

(57) ABSTRACT

System including one or more touch-sensitive control surfaces on which control elements, which are arranged next to each other, are displayed. Using a control device with controller software, the control elements can determine amongst themselves via the controller software, when a respective control element should be active or deactivated when touched.

18 Claims, 2 Drawing Sheets

(51) Int. Cl.
*G06F 3/039* (2013.01)
*G06F 3/0488* (2022.01)
*B60K 35/10* (2024.01)

(52) U.S. Cl.
CPC ............ *G06F 3/0488* (2013.01); *B60K 35/10* (2024.01); *B60K 2360/1434* (2024.01)

(56) References Cited

U.S. PATENT DOCUMENTS

| | | | | |
|---|---|---|---|---|
| 7,607,087 | B2 * | 10/2009 | Prados | B60K 35/00 |
| | | | | 715/702 |
| 9,405,367 | B2 * | 8/2016 | Jung | G06F 3/0416 |
| 9,417,754 | B2 * | 8/2016 | Smith | G06F 3/048 |
| 9,593,765 | B2 * | 3/2017 | Kim | F16H 59/08 |
| 10,088,035 | B2 * | 10/2018 | Park | F16H 59/044 |
| 10,801,610 | B2 * | 10/2020 | Cha | F16H 59/08 |
| 11,175,821 | B2 * | 11/2021 | Xu | G06F 3/04817 |
| 2008/0024459 | A1 * | 1/2008 | Poupyrev | G06F 3/0488 |
| | | | | 345/173 |
| 2008/0211779 | A1 * | 9/2008 | Pryor | G06F 3/0488 |
| | | | | 345/173 |
| 2009/0195659 | A1 * | 8/2009 | Nagata | H04N 5/2256 |
| | | | | 345/173 |
| 2010/0268426 | A1 * | 10/2010 | Pathak | G06F 3/04886 |
| | | | | 345/173 |
| 2012/0113009 | A1 | 5/2012 | Hotelling et al. | |
| 2013/0134730 | A1 * | 5/2013 | Ricci | G06N 5/02 |
| | | | | 296/24.34 |
| 2014/0149909 | A1 * | 5/2014 | Montes | F16H 59/08 |
| | | | | 715/771 |
| 2015/0167825 | A1 * | 6/2015 | Kim | F16H 59/08 |
| | | | | 74/473.12 |
| 2015/0292614 | A1 * | 10/2015 | Kim | F16H 59/12 |
| | | | | 74/473.12 |
| 2016/0137063 | A1 * | 5/2016 | Fribus | F16H 63/42 |
| | | | | 74/473.12 |

FOREIGN PATENT DOCUMENTS

| | | | | |
|---|---|---|---|---|
| DE | 102013210833 | A1 | 12/2014 | |
| DE | 102015216714 | A1 | 3/2017 | |
| EP | 1560102 | A2 * | 8/2005 | ............ B60K 35/00 |
| JP | 2006177401 | A * | 7/2006 | |

* cited by examiner

AUTOMOTIVE OPERATING SYSTEM

CROSS REFERENCE TO RELATED APPLICATION

The present application claims priority to International Patent Application No. PCT/EP2019/083028 to Wojciech Huwer, filed Nov. 29, 2019, titled "Automotive Operating System", which claims priority to German Patent Application no. 10 2018 221 706.8, to Wojciech Huwer, filed Dec. 13, 2018, the contents of each being incorporated by reference in its entirety herein.

TECHNICAL FIELD

The present disclosure relates to an operating system for a vehicle, a method for operating an operating system for a vehicle, a control unit, and a vehicle.

BACKGROUND

Various operating elements are used in the automotive industry, e.g., for motor vehicles. These include touch-sensitive operating elements. These are operated by a user touching or approaching them. These touch-sensitive operating elements may also have display functions, such as touchscreens. Touch-sensitive control panels normally contain numerous touch-sensitive operating elements with which different functions in the vehicle can be operated. These include functions relating to information, entertainment, comfort or vehicle lighting, by way of example.

Touch-sensitive operating elements can be unintentionally operated, in particularly while driving. This can be caused by vibrations, or spatial proximity to the operating element. If the user rests his hand while operating the operating element, this may result in an unintentional actuation of another operating element.

SUMMARY

Aspects of the present disclosure are therefore to create technical solutions with which unintentional operation is easily and safely prevented.

Some aspects relate to an operating system for a vehicle, that include a control unit and a touch-sensitive user interface, wherein the control unit is configured to control a display of numerous operating elements on the user interface, register a user selection on the user interface in the region of at least one displayed operating element, and then control a function assigned to the selected operating element, wherein the control unit is also configured to block at least one function assigned to at least one other operating element while the operator has selected the operating element.

Such configurations may have the advantage that, when operating an operating element, unintended touching or approaching another operating element does not result in an unintentional triggering of a function that can be controlled with the other operating element. This may advantageously increase the operating safety and convenience.

By adapting control software, control units can assume control of numerous functions, and are therefore be particularly flexible and can be quickly and easily adapted. As a result, a conventional control unit for a vehicle can be advantageously adapted and configured in terms of software to control the operating elements in a reciprocal dependence on their operating states in the operating system of the present disclosure. This can be achieved with little effort. If the operating elements are already provided in the vehicle, there is no need for further hardware.

In other aspects, a method is disclosed for operating an operating system for a vehicle, wherein the operating system includes a control unit and a touch-sensitive user interface. The method may include controlling a display of numerous operating elements on the user interface by the control unit; making a user selection on the user interface in the region of a displayed operating element; registering the user selection by the control unit; controlling a function assigned to the selected operating element by the control unit; and blocking at least one function assigned to at least one other operating element during the user selection by the control unit.

The operating system operated in the method can be an operating system configured to perform any of the method steps disclosed herein. The technical teachings disclosed in reference to the operating system can be applied to the disclosed methods, and vice versa.

The operating system is preferably used in a vehicle.

Various examples disclosed herein are related to a system including one or more touch-sensitive user interfaces on which adjacent operating elements are displayed. Using a control unit with a control software, the operating elements can determine among themselves via the control software, when a respective operating element should respond to touch, or is deactivated.

The various embodiments of the present disclosure specified in this application can be advantageously combined with one another, as long as not otherwise specified.

BRIEF DESCRIPTION OF THE DRAWINGS

The present disclosure shall be explained below in reference to exemplary embodiments, based on the associated drawings. Therein.

DETAILED DESCRIPTION

Figure 1:
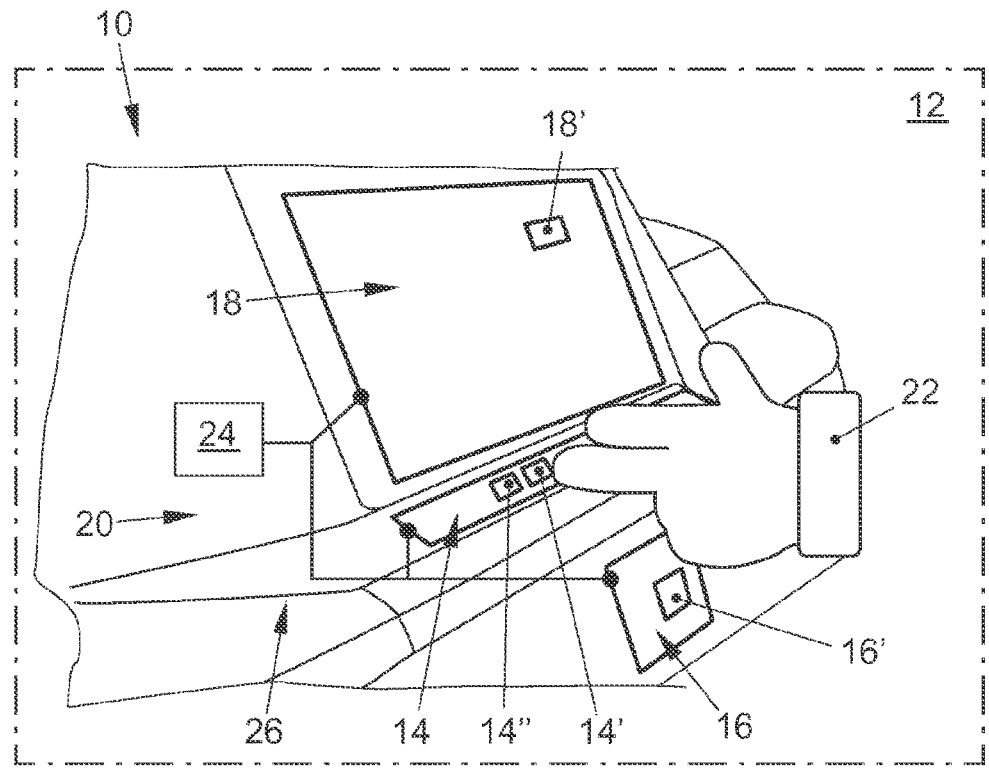
FIG. 1 shows a schematic sequence of one embodiment of a method for operating an operating system according to the invention based on selection signals.

In some examples described herein, a control unit and a user interface may be integrated in one another. Alternately, the user interface can represent the periphery of the control unit. The user interface can also be divided into numerous user interfaces that form the periphery of the control unit. The operating elements may be configured to send their signals to the control unit via a bus system. This can be a Local Interconnect Network (LIN) or Controller Area Network (CAN) bus system, in some examples.

The blocking of a function of an operating element can take place, e.g., in that a pixel region surrounding the selected operating element is defined, and all of the inputs on the user interface lying outside the pixel region, and thus assigned to other operating elements, may be ignored by the processing system. This may be particularly advantageous if numerous operating elements are displayed on a user interface. If different operating elements are displayed on different user interfaces, inputs on certain user interfaces can be entirely ignored.

Blocking a function in such a case means that, when a user touches or approaches a respective operating element on the user interface, the function assigned to the operating element is not triggered. A function may also be referred to as blocked when it is already blocked, and remains so due to a user selection. A user selection refers to when the user has sufficiently approached the operating element, such that the user interface reacts in the region of this operating element.

In some examples of the operating system of the present disclosure, the control unit may be configured to block all of the functions assigned to other operating elements when at least one operating element has been selected by a user.

The operating safety of the operating system is therefore significant. This is of particular interest when all of the operating elements are displayed close to one another, such that the operation of one of the operating elements involves the danger of unintentional operation of numerous other operating elements.

In another example of the operating system, the control unit may be configured to unblock at least one function assigned to at least one other operating element when the first operating element is no longer selected, and the control unit may also be configured to control the function of a previously blocked operating element when it is selected, and the control unit is also configured to block at least the function of the previously selected operating element as long as the new operating element is selected.

In other words, the operating elements can be blocked and unblocked in a reciprocally dependent manner by the control unit, both unidirectionally and bidirectionally.

This contributes to a further increase in operating safety. When numerous operating elements are selected simultaneously, the functions of all of the operating elements can preferably be blocked, or a prioritization can be stored in the control unit. Because an exactly simultaneous touch is highly unlikely, a person of ordinary skill in the art should determine time intervals between touching numerous operating elements, based on the teachings disclosed herein, which could be seen as being practically simultaneous. The prioritizing or the time intervals can likewise be stored in the control unit.

In another preferred embodiment of the operating system of the present disclosure, the operating elements can be displayed directly adjacently on a single user interface or on numerous directly adjacent user interfaces.

"Directly" as used herein may mean that the operating elements are subject to the risk of unintended contact due to the spatial proximity. This may be the case, for example, if the operational elements are displayed on the same user interface, or different user interfaces are close together. This may be the case, for example, in a central console in a vehicle, where user interfaces may also be arranged in the form of toolbars or control panels. A spacing is preferably selected to derive a specifiable spacing between the operating elements or user interfaces that lies in the range of the size of an average human hand or less. The spacing can also preferably be up to 250 mm or less.

In some examples, all of the functions assigned to other operating elements may be blocked by the control element during the user selection of the one operating element.

In other examples, after a user selection of the one operating element is completed, the at least one function assigned to the at least one other operating element may be unblocked by the control unit, and a user selects another operating element, the function of which was previously blocked, and the function of the other operating element may be controlled by the control unit during the user selection of the other operating element, and the control unit blocks at least the function of the previously selected operating element during the user selection of the other operating element.

In this manner, the reciprocal control of the blocking of the functions of the operating elements via the control unit can also be bidirectional, making the method of the present disclosure very flexible, and safe in different operating situations.

In another example, the operating elements may be displayed directly adjacent to one another on the same user interface or on numerous user interfaces that are directly adjacent to one another.

Another aspect of the present disclosure relates to a control unit configured to execute methods in accordance with the technologies and techniques disclosed herein.

A control unit for a vehicle may be configured via control software to operate an operating system in a vehicle, preferably an operating system according to the present disclosure, in the manner according to the technologies and techniques disclosed herein.

Another aspect of the present disclosure relates to a vehicle comprising an operating system according to the present disclosure, and a control unit according to the present disclosure in accordance with the technologies and techniques disclosed herein.

A vehicle according to the present disclosure can also preferably be used in a method according to the present disclosure in accordance with the technologies and techniques disclosed herein. The technical teachings disclosed in reference to the operating system, the control unit, and the method of the present disclosure can therefore be applied to the vehicle according to the present disclosure, and vice versa.

The vehicle of the present disclosure can preferably be a motor vehicle.

Turning to FIG. 1, an operating system 10 is shown the upper part of the figure, which is shown as part of a vehicle 12. Further details of the vehicle are not provided here for the purposes of brevity.

The operating system 10 in the present example may include three touch-sensitive user interfaces 14, 16, 18. Various operating elements can be displayed on the user interfaces 14, 16, 18, indicated here by way of example as operating elements 14', 16', 18', via which the functions of the vehicle 12 can be operated. By way of example, the user interfaces 14, 16, 18 may be integrated in a central console 20 in the vehicle 12.

The user interfaces 14, 16, 18 may be functionally connected to a control unit 24 via a bus system 44, by way of example. The control unit 24 controls the display of the operating element 14', 16', 18' on the user interfaces 14, 16, 18 and registers the user selection in that the user interfaces 14, 16, 18 send corresponding signals to the control unit 24. The control unit 24 then controls the functions assigned to the operating elements 14', 16', 18'.

It can be seen that the user interfaces 14, 16, 18 are directly adjacent to one another. As a result, when the user 22 intends, purely by way of example, to operate the operating element 14', the operating element 16' may be unintentionally touched.

If, for example, the user 22 touches the operating element 14', the user interface 14 generates a selection signal 26. The selection signal 26 can represent the selection of the user interface 14 as such, when one operating element 14', 16', 18' is displayed in each respective user interface 14, 16, 18, as in this example. The control unit 24 can clearly determine which function of the vehicle 12 is to be controlled in this case, because each of the user interfaces 14, 16, 18 displays only one operating element 14', 16', 18'.

If numerous operating elements 14', 16', 18' are displayed in each user interface 14, 16, 18, as is discussed below, assignments of specific regions on the respective user interfaces 14, 16, 18 from which the selection signals 26 originate can be stored in the control unit 24. Because the control unit 24 controls the display of the operating elements 14', 16', 18', it can then determine which concrete operating element 14', 16', 18' on the user interface 14, 16, 18 is represented by the selection signal 26.

The selection signal 26 corresponding to the selection can have a strong signal level 28 for example. This can be a voltage or current signal.

The strength of the signal level 28 can be in volts or amperes within a useful range determined by the person skilled in the art.

When no selection is made, the user interfaces 14, 16, 18 may generate a selection signal 26 with a weak signal level 30.

In this example, the control unit 24 registers when the signal level 26 increases to a strong signal level 28 at the moment that the user element 14' is touched, e.g., on the user interface 14.

The control unit 24 then controls the function of the vehicle 12 assigned to the operating element 14', and simultaneously blocks 32 the functions assigned to the other operating elements 16', 18' on the user interfaces 16, 18.

During the blockage 32, even an intentional touching of the operating element 16', for example, does not trigger the function to which it is assigned.

After touching the operating element 14', e.g., after the user 22 input is completed, the selection signal 26 is generated by the user interface 14 with a weaker signal level 30. The control unit 24 then unblocks 34 the previously blocked functions of the other operating elements 16', 18' on the user interfaces 16, 18.

The method can then continue analogously to the steps described above. If, for example, one of the operating elements 16', 18' is touched by the user 22, and the selection signal 26 corresponding to the selection is generated with a stronger signal level 28, the functions of the other operating elements, e.g., operating element 14' and one of the operating elements 16' or 18', specifically that which has not been touched, are then blocked analogously by the control unit 24.

In cases in which the selection signal 26 assumes a transitional signal level 36 between the strong signal level 28 and the low signal level 30, the control unit 24 can then determine whether the selection signal 26 corresponds to the initiation of a user selection or the ending of a user selection. The control unit 24 can then behave, e.g., in accordance with a selection signal 26 with a strong signal level 28 or a weak signal level 30, derived from the last known clear signal level 26.

The selection signal 26 in the case of an error, for example, can also assume a value that lies above the strong signal level 28, thus forming an error signal level 38, for example. A control sequence 40 can be called "block 32" in such cases, e.g., for the functions of all of the operating elements 14', 16', 18'. The person skilled in the art would then take appropriate steps for such errors, e.g., by resetting the operating system 10. These steps can also be readily stored in the control unit 24.

The range of signal strengths for the selection signal 26 in relation to the respective control sequences 40 shown in the table can be determined by the person skilled in the art based on the teachings disclosed in this disclosure.

As stated above, numerous operating elements 14', 16', 18' can be shown in each user interface 14, 16, 18. This is shown by way of example by the operating element 14" on the user interface 14.

In such a case, the control unit 24 assigns, e.g., specific pixel areas on the user interface 14, to the respective operating elements 14', 14", in which they are displayed. The selection signal 26 may then be assigned to the pixel area for the operating element 14' when the operating element 14' is selected, as shown herein by way of example. As a result, a function assigned to the pixel area for the operating element 14", or the operating element 14", is likewise blocked. All of the other functions on the user interface 14, aside from the pixel area for the operating element 14', or the operating element 14', can also be blocked.

Figure 2:
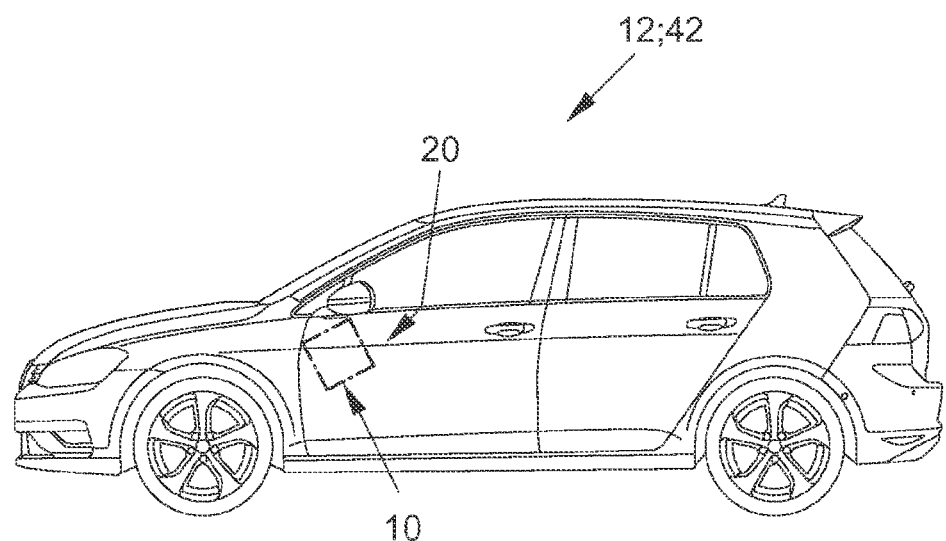
FIG. 2 shows one embodiment of a vehicle according to the invention.

FIG. 2 shows a vehicle 12 according to the present disclosure, which is a motor vehicle 42 in the present example.

The motor vehicle 42 includes an operating system 10 according to the present disclosure, as described by way of example in reference to FIG. 1.

The operating system 10 is integrated in a central console 20 in the motor vehicle 42, by way of example.

LIST OF REFERENCE SYMBOLS

10 operating system
12 vehicle
14 user interface
14' operating element
14" operating element
16 user interface
16' user interface
18 user interface
18' user interface
20 central console
22 user
24 control unit
26 selection signal
28 stronger signal level
30 lower signal level
32 blockage
34 unblocking
36 transitional signal level
38 error signal level
40 control sequence
42 motor vehicle
44 bus system

The invention claimed is:

1. A system for a vehicle, comprising:
a control unit; and
a touch-sensitive user interface, wherein the control unit is configured to control a display of a plurality of operating elements on the user interface, register a user selection of an operating element on the user interface, in a region
of the plurality of operating elements, the registration of the user selection comprises determining a signal level; determine a signal level strength from a plurality of different signal level strengths corresponding to different press force intensities, including transitional signal levels, of the user selection, wherein a dynamic control sequence for controlling and blocking vehicle functions is determined based on the determined signal level strength corresponding to the press force intensity; and control a function assigned to the selected operating element based on the determined signal level strength and the dynamic control sequence corresponding to the press force intensity, wherein the control unit is configured to block at least one function assigned to at least one of the other plurality of operating elements according to the control sequence determined based on the press force intensity.

2. The system of claim 1, wherein the control unit is configured to block all of the functions assigned to the other plurality of operating elements when a user has selected the at least one operating element.

3. The system of claim 2, wherein the control unit is configured to unblock at least one blocked function assigned to the at least one other operating element after completion of the user selection of the operating element according to the control sequence.

4. The system of claim 2, wherein the control unit is configured to control the functions of the other operating elements according to the control sequence, when another user selection is registered on another operating element, the function of which was previously blocked.

5. The system of claim 4, wherein the control unit is configured to block at least a function of a previously selected operating element during the selection of the another operating element according to the control sequence.

6. The system of claim 1, wherein the control sequence comprises, in response to detecting a signal level strength corresponding to press force intensity: adjusting sensitivity of other touch fields, initiating vehicle functions, or blocking and unblocking functions based on user selection initiation and ending.

7. A method of controlling an operating system of a vehicle, comprising:
generating a display on a touch-sensitive user interface, the display comprising a plurality of operating elements on the user interface;
registering a user selection of an operating element of the plurality of operating elements on the user interface, in a region of the plurality of operating elements, the registering of the user selection comprises determining a signal level;
determining a signal level strength from a plurality of different signal level strengths corresponding to different press force intensities, including transitional signal levels, of the user selection, wherein a dynamic control sequence for controlling and blocking vehicle functions is determined based on the determined signal level strength corresponding to the press force intensity; and
controlling, via a control unit, a function assigned to the selected operating element based on the determined signal level strength and the dynamic control sequence corresponding to the press force intensity; and
blocking, via the control unit, at least one function assigned to at least one of the other plurality of operating elements according to the dynamic control sequence determined based on the press force intensity.

8. The method of claim 7, further comprising blocking all of the functions assigned to the other plurality of operating elements when a user has selected the at least one operating element.

9. The method of claim 8, further comprising unblocking at least one blocked function assigned to the at least one other operating element after completion of the user selection of the operating element according to the control sequence.

10. The method of claim 8, further comprising controlling the functions of the other operating elements according to the control sequence, when another user selection is registered on another operating element, the function of which was previously blocked.

11. The method of claim 10, further comprising blocking at least a function of a previously selected operating element during the selection of the another operating element according to the control sequence.

12. The method of claim 7, wherein the dynamic control sequence comprises, in response to detecting a signal level strength corresponding to press force intensity: adjusting sensitivity of other touch fields, initiating vehicle functions, or blocking and unblocking functions based on user selection initiation and ending.

13. A non-transitory computer-readable medium having stored therein instructions executable by one or more processors of a vehicle to:
generate a display on a touch-sensitive user interface, the display comprising a plurality of operating elements on the user interface;
register a user selection of an operating element of the plurality of operating elements on the user interface, in a region of the plurality of operating elements, the registration of the user selection comprising determining a signal level;
determine a signal level strength from a plurality of different signal level strengths corresponding to different press force intensities, including transitional signal levels, of the user selection, wherein a dynamic control sequence for controlling and blocking vehicle functions is determined based on the determined signal level strength corresponding to the press force intensity; and
control, via a control unit, a function assigned to the selected operating element based on the determined signal level strength and the dynamic control sequence corresponding to the press force intensity; and
block, via the control unit, at least one function assigned to at least one of the other plurality of operating elements according to the dynamic control sequence determined based on the press force intensity.

14. The non-transitory computer-readable medium of claim 13, wherein the non-transitory computer-readable medium is further configured to block all of the functions assigned to the other plurality of operating elements when a user has selected the at least one operating element.

15. The non-transitory computer-readable medium of claim 14, wherein the non-transitory computer-readable medium is further configured to unblock at least one blocked function assigned to the at least one other operating element after completion of the user selection of the operating element according to the control sequence.

16. The non-transitory computer-readable medium of claim 14, wherein the non-transitory computer-readable medium is further configured to control the functions of the other operating elements according to the control sequence, when another user selection is registered on another operating element, the function of which was previously blocked.

17. The non-transitory computer-readable medium of claim 16, wherein the non-transitory computer-readable medium is further configured to block at least a function of a previously selected operating element during the selection of the another operating element according to the control sequence.

18. The non-transitory computer-readable medium of claim 13, wherein the dynamic control sequence comprises, in response to detecting a signal level strength corresponding to press force intensity: adjusting sensitivity of other touch fields, initiating vehicle functions, or blocking and unblocking functions based on user selection initiation and ending.

\* \* \* \* \*